(12) United States Patent
Nesper et al.

(10) Patent No.: US 6,530,597 B1
(45) Date of Patent: Mar. 11, 2003

(54) DEVICE FOR PROTECTING VEHICLE OCCUPANTS IN A MOTOR VEHICLE

(75) Inventors: Reiner Nesper, Jadeberg (DE); Shusei Watanabe, Funabashi (JP); Günter Heitzer, Pfatter (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/524,235

(22) Filed: Mar. 13, 2000

Related U.S. Application Data (63) Continuation of application No. PCT/DE98/02614, filed on Sep. 3, 1998.

(30) Foreign Application Priority Data

Sep. 11, 1997 (DE) .......................... 197 40 021

(51) Int. Cl.⁷ .............................. B60R 21/32; B60Q 1/00
(52) U.S. Cl. ....................... 280/735; 701/45; 340/436
(58) Field of Search .................... 280/735; 180/271, 180/282; 701/45; 340/436, 438, 439

(56) References Cited

U.S. PATENT DOCUMENTS

| | | | | |
|---|---|---|---|---|
| 5,357,141 A | * | 10/1994 | Nitschke et al. | 280/735 |
| 5,449,198 A | * | 9/1995 | Jeenicke et al. | 280/735 |
| 5,467,272 A |  | 11/1995 | Tatsuya | |
| 5,544,915 A | * | 8/1996 | Fendt et al. | 280/735 |

(List continued on next page.)

FOREIGN PATENT DOCUMENTS

| | | | |
|---|---|---|---|
| DE | 37 43 961 A1 | 7/1989 | |
| DE | 38 11 217 A1 | 10/1989 | |
| DE | 41 12 579 A1 | 10/1991 | |
| DE | 44 25 846 A1 | 1/1996 | |
| DE | 195 19 130 A1 | 12/1996 | |
| DE | 196 37 423 A1 | 3/1997 | |
| DE | 196 09 076 C1 | 8/1997 | |
| DE | 196 19 117 A1 | 11/1997 | |
| EP | 0 471 871 B1 | 1/1994 | |
| EP | 0 841 222 A1 | 5/1998 | |
| WO | WO 96/32302 | * 10/1996 | ........... B60R/21/32 |
| WO | WO 97/01458 | * 1/1997 | ........... B60R/21/00 |
| WO | WO 97/21565 | * 6/1997 | ........... B60R/21/32 |
| WO | WO 97/32757 | * 9/1997 | ........... B60R/21/32 |

OTHER PUBLICATIONS

Published International Application No. WO 89/09146 (Nitschke et al), dated Oct. 5, 1989, as mentioned on p. 2, of the specification.

*Primary Examiner*—Paul N. Dickson
*Assistant Examiner*—Joselynn Y Sliteris
(74) *Attorney, Agent, or Firm*—Laurence A. Greenberg; Werner H. Stemer; Ralph E. Locher (57) ABSTRACT

A device for protecting vehicle occupants in a motor vehicle has an impact sensor unit which is provided remote from a central region of the vehicle. The impact sensor unit is connected, via a data line for transmitting code signals, to a firing unit which is provided at an assigned vehicle occupant protection device. The firing unit contains an energy source which provides energy for triggering the assigned vehicle occupant protection device.

19 Claims, 5 Drawing Sheets

U.S. PATENT DOCUMENTS

| | | | |
|---|---|---|---|
| 5,620,202 A | * 4/1997 | Gray et al. | 280/735 |
| 5,712,784 A | * 1/1998 | Fendt et al. | 280/735 |
| 5,718,452 A | * 2/1998 | Vogt | 280/735 |
| 5,758,899 A | * 6/1998 | Foo et al. | 280/735 |
| 5,825,098 A | * 10/1998 | Darby et al. | 701/45 |
| 5,826,902 A | * 10/1998 | Foo et al. | 280/735 |
| 5,835,873 A | * 11/1998 | Darby et al. | 701/45 |
| 5,916,289 A | * 6/1999 | Fayyad et al. | 280/735 |
| 5,977,653 A | * 11/1999 | Schmid et al. | 280/735 |
| 6,016,884 A | * 1/2000 | Swart et al. | 180/280 |
| 6,020,812 A | * 2/2000 | Thompson et al. | 280/735 |
| 6,036,224 A | * 3/2000 | Wachter et al. | 280/735 |
| 6,052,635 A | * 4/2000 | Swart et al. | 280/735 |
| 6,081,044 A | * 6/2000 | Anthofer et al. | 280/735 |
| 6,095,554 A | * 8/2000 | Foo et al. | 280/735 |
| 6,099,031 A | * 8/2000 | Bischoff | 280/735 |
| 6,115,654 A | * 9/2000 | Eid et al. | 280/735 |

* cited by examiner

|  | $AS_1$ | $AS_2$ | $AS_3$ | $AS_4$ | $AS_5$ | $AS_6$ | $AS_7$ | X | Y |
|---|---|---|---|---|---|---|---|---|---|
| $IS_1$ | L |  |  |  |  |  |  | 1 |  |
| $IS_2$ | H | L |  |  |  |  |  | 1 |  |
| $IS_3$ |  | L |  |  |  |  |  | 1 |  |
| $IS_4$ | L | H |  |  |  |  |  | 1 |  |
| $IS_5$ |  |  | 1 |  |  |  |  |  | 1 |
| $IS_6$ |  |  |  | 1 |  |  |  |  | 1 |
| $IS_7$ | L |  |  |  |  |  |  | 1 |  |
| $IS_8$ |  | L |  |  |  |  |  | 1 |  |
| $IS_9$ |  |  |  |  | 1 |  |  |  | 1 |
| $IS_{10}$ |  |  |  |  |  | 1 |  |  | 1 |
| $IS_{11}$ | L |  |  |  |  |  |  | 1 |  |
| $IS_{12}$ | L |  |  |  |  |  |  | 1 |  |
| $IS_{13}$ |  | L |  |  |  |  |  | 1 |  |

FIG 3B

|  | $AS_1$ | $AS_2$ | $AS_3$ | $AS_4$ | $AS_5$ | $AS_6$ | $AS_7$ | X | Y |
|---|---|---|---|---|---|---|---|---|---|
| $IS_7$ |  |  |  |  |  |  | 1 | 1 |  |
| $IS_8$ |  |  |  |  |  |  | 1 | 1 |  |
| $IS_{11}$ |  |  |  |  |  |  | 1 | 1 |  |
| $IS_{12}$ |  |  |  |  |  |  | 1 | 1 |  |
| $IS_{13}$ |  |  |  |  |  |  | 1 | 1 |  |

DEVICE FOR PROTECTING VEHICLE OCCUPANTS IN A MOTOR VEHICLE

CROSS-REFERENCE TO RELATED APPLICATION

This application is a continuation of copending International Application No. PCT/DE98/02614, filed Sep. 3, 1998, which designated the United States.

BACKGROUND OF THE INVENTION

1. Field of the Invention

The invention relates to a device for protecting vehicle occupants in a motor vehicle.

A device for protecting vehicle occupants usually has one or more impact sensors for detecting an impact. An evaluation circuit evaluates the signals supplied by the impact sensors and activates, as a function of the impact, selected firing elements of vehicle occupant protection devices. The firing elements are electrically connected to the evaluation device. Such vehicle occupant protection devices are, in particular, the driver's and front seat passenger's airbags, the side airbag, the head airbag, the seat belt pretensioning device or the like. The evaluation device is usually accommodated in a control device which is provided at a central position in the vehicle. Such a control device is preferably provided on the vehicle tunnel or at some other central position in the vehicle, for example the dashboard, preferably in the interior of the motor vehicle. The control device contains an energy source from which the firing elements, which are each respectively connected by a two wire lead, are provided with energy when an impact is detected.

International Publication No. WO 89/09146 A discloses a device for protecting vehicle occupants in a motor vehicle, in which impact sensors are connected to a central evaluation device via a bus line.

European Patent EP 0 471 871 B1 discloses a device for protecting vehicle occupants in a motor vehicle in which a central evaluation device is electrically connected via a bus line to firing units which are provided in remote positions.

Both devices have in common that, as the number of sensors and firing elements connected to the respective device for protecting vehicle occupants rises, the demands made on the computing power of the central evaluation device increases considerably, in particular also due to the communication needs which have to be coped with.

2. Summary of the Invention

It is accordingly an object of the invention to provide a device for protecting vehicle occupants in a motor vehicle, which overcomes the above-mentioned disadvantages of the heretofore-known devices of this general type and which can cooperate with or serve a multiplicity of impact sensors and/or firing elements in a motor vehicle.

With the foregoing and other objects in view there is provided, in accordance with the invention, a device for protecting vehicle occupants in a motor vehicle, including:
a data line configured as a bus line;
at least two impact sensor units to be disposed remote from a central region of a motor vehicle, each of the at least two impact sensor units having an impact sensor unit interface connected to the data line for outputting a code signal onto the data line; and
at least two firing units to be disposed at respectively assigned vehicle occupant protection devices, the at least two firing units being connected to the at least two impact sensor units via the data line, each of the at least two firing units having a firing unit interface for receiving the code signal and having an energy source for providing energy for triggering the respectively assigned vehicle occupant protection devices.

According to the invention, an impact sensor unit is connected directly to the assigned firing unit using a data line. Here, the impact sensor unit is provided at a location remote from a central position in the vehicle, with the result that an impact sensor of the impact sensor unit can detect an impact as close as possible to a potential impact location. Such impact sensors which are provided remote from a central position—that is to say for example in the front region, the crush zone of the vehicle, or on its sides—are also called "remote sensors" or "satellite sensors". The firing unit is usually provided spatially near to the assigned vehicle occupant protection device. This prevents the line routes between the firing controller and the firing element which is assigned to the vehicle occupant protection device from being long and therefore at risk of short-circuiting and prone to interference signals, which would result, in particular, in unintended triggering of the vehicle occupant protection device. It is essential to the invention that an encoded data transmission takes place from the impact sensor unit to the firing unit, and for this purpose the impact sensor unit has an interface for outputting code signals onto the data line, and the firing unit has an interface for receiving these code signals.

In accordance with a preferred feature of the invention, a plurality of impact sensor units and/or a plurality of firing units are connected to the data line, and the data line is then embodied as a bus line and the data are preferably transmitted using a multiplex method.

The impact sensor unit is embodied in such a way that it has at least one impact sensor for detecting an impact, and an evaluator—referred to below as impact evaluator—for the detected impact profile or impact course.

The firing unit is preferably embodied in such a way that it has an evaluator for the code signals which are received via the data line—referred to below as firing evaluator—, an energy source for providing firing energy for the assigned vehicle occupant protection device, a firing element which is assigned to the vehicle occupant protection device, and a switching device, controllable by the firing evaluator, for electrically connecting the energy source to the firing element.

The characterizing feature of the invention is in particular that the functionality of a central evaluation device, which is known from the prior art, is distributed spatially, part of this functionality being assigned spatially to the impact sensor. This functionality is implemented through the use of the impact evaluator, which is preferably provided spatially together with the associated impact sensor in a common housing, namely in the impact unit. The impact sensor, the impact evaluator and at least the associated interface for a connection to the data line or bus line form together an impact sensor unit. According to the invention, the other part of the functionality of the known central evaluation unit is spatially assigned to the firing element of a vehicle occupant protection device and is implemented in the firing evaluator. The firing evaluator, the associated interface for a connection to the bus line, the associated firing element, the energy source and the controllable switch form together a firing unit, wherein all the components of this firing unit, with the exception of the firing element are also spatially accommodated in a common housing, namely in the firing device.

The functionality which is assigned to the impact sensor is preferably to perform an evaluation of an impact which is detected by the impact sensor. If, for example, the impact sensor is an acceleration sensor or a sensor for the deformation of the car body at the location of the sensor, such an impact sensor supplies a signal which corresponds to the impact profile or in other words the temporal course of the impact and is subsequently evaluated by the impact evaluator: for example the impact signal which is acquired or a signal which is derived from it is compared with different threshold values. If the impact signal exceeds one of the threshold values stored in a memory of the impact sensor unit, this information is put onto the bus line, as an encoded message, with the intention of informing one or more assigned firing units of the current impact state. As a result of a code signal relating to the impact state at a given time, one or more of the connected firing units may change their operating state. A change in the operating state may be due, in particular, to the fact that the firing unit is changed from a "not ready to trigger" operating state into an "increased readiness to trigger" operating state. The "not ready to trigger" operating state requires at least two defined code signals from defined evaluation units to trigger the associated firing element. The "increased readiness to trigger" operating state requires, on the other hand, only a single further defined code signal of a defined impact sensor unit to be detected.

The evaluation functions which are implemented in the impact evaluator are therefore usually restricted to a classification of the supplied impact signal, if appropriate also taking into account the dynamics and/or the timing profile of the impact signal, but if appropriate are also merely restricted to a discretization of an analog impact signal. The impact signal is preferably not subjected directly to the above-described threshold value comparisons or the above-described discretization, but rather the signal is one which is derived from the impact signal by integration, filtering, amplification, mean-value formation, inclusion of past values or other operations.

On the other hand, the functionality implemented in the firing evaluator is preferably oriented toward a triggering strategy or a triggering algorithm which causes the associated firing element to be fired as a function of the impact states which have been determined and transmitted by the impact sensor units. Preferably, a single code signal of an impact sensor unit can also cause a specific firing element to fire, in which case the firing unit then merely registers this firing code signal via its interface and decodes it. After that, the firing evaluator compares the transmitted firing code signal with a stored firing code signal which complies with the specifications, and in the event of correspondence switches the controllable switching device to a conductive state with the result that the firing element is supplied with energy and fires.

Preferably, in addition to the at least one impact sensor unit, a control unit is connected to the data line. This control unit can perform different functions: for instance the control unit preferably has an acceleration sensor which, independently of other impact sensors, detects an impact at least from one direction sector. In order, to detect an impact, if possible independently of its direction of impact, a longitudinal acceleration sensor for registering accelerations along the longitudinal axis of the vehicle and a transverse acceleration sensor for registering accelerations transversely with respect to the longitudinal axis of the vehicle are preferably provided at the control unit. An evaluator of the control unit evaluates and classifies, in an identical or similar way to the impact evaluator, the acceleration signals which are supplied by the central acceleration sensors, and transmits, for example, code signals onto the data line if the transverse acceleration signal or the longitudinal acceleration signal exceed predefined limiting values stored in a memory of the control unit. Code signals which are generated in this way can, on the one hand, initiate directly, as firing code signals, the firing of assigned firing elements. However, on the other hand, such a code signal which is supplied by the control unit and is based on the evaluation of the central acceleration signals is preferably an enable code signal which, as described above, transfers a defined firing unit from a first "not ready to trigger" operating state into a further "increased readiness to trigger" operating state with the result that the firing element is triggered only if a further firing code signal of a predetermined impact sensor unit is detected as such a signal by the firing unit at the same time as the enable code signal.

Instead of or in addition to the acceleration sensors of the control unit, it is also possible to provide sensors in particular for detecting objects and/or vehicle occupants. The evaluation of the signals supplied by these sensors, or transmitted vehicle occupant states, can also cause code signals to be output onto the bus line by the control unit. Such code signals are preferably predominantly provided as enable signals or disable signals for the triggering of a firing element which is connected to the bus line.

The control unit is preferably provided in a central position, that is to say for example on the vehicle tunnel, in the vicinity of the vehicle tunnel or on the dashboard: such a spatial positioning or configuration has the advantage that only short line routes are necessary for connecting the object detection or vehicle occupant detection sensor systems which are mostly provided in or on the vehicle seat. On the other hand, acceleration sensors which are provided centrally at the control unit can sense the acceleration at the location of the vehicle occupant. The evaluator of the control unit, the associated interface for the connection to the bus line, associated acceleration sensors and—if necessary—an interface for connecting a device for the object or vehicle occupant detection system form together the control unit, the components being preferably provided together in a common housing as an electrical control device.

The triggering strategies which are stored in the individual firing units can have different presettings or instruction rules: for instance a firing element can be fired only if a single assigned impact sensor unit indicates an impact of a particular strength. The firing element is assigned that particular impact sensor unit which detects an impact which the associated vehicle occupant protection device is intended to protect against—that is to say, for example, a side impact sensor is assigned to the firing element of a side airbag—, in which case when there are a plurality of impact sensors which are directed in the same direction that impact sensor which is provided at the shortest distance from the vehicle occupant protection device is selected as the decisive sensor. According to these specifications, impact sensors are provided all around the vehicle at points which are particularly prone to impacts. Each impact sensor unit thus detects an impact in an assigned spatial region and is decisive for the triggering of specific assigned vehicle occupant protection device.

In accordance with another feature of the invention, the device for detecting objects or vehicle occupants is connected to the bus line (data line) and has an interface for outputting code signals onto the bus line.

In accordance with yet another feature of the invention, the impact evaluator supplies a firing code signal as a function of the registered impact profile.

In accordance a further feature of the invention, the impact evaluator supplies a firing code signal if the impact signal which is supplied by the impact sensor, or if a signal which is derived from the impact signal, exceeds a threshold value.

In accordance with yet a further feature of the invention, the impact sensor is embodied as an acceleration sensor and supplies an acceleration signal.

In accordance with another feature of the invention, the switching device is switched to a conductive state by the firing evaluator if the firing evaluator detects a defined firing code signal.

In accordance with yet another feature of the invention, the switching device is switched to a conductive state by the firing evaluator if the firing evaluator detects at least a first defined firing code signal of a first impact sensor unit and/or a further defined firing code signal of a further impact sensor unit.

The triggering strategy described above can be expanded with a so-called safing function: at least one additional impact sensor unit which is sensitive in the same impact direction or the centrally provided control unit supplies an enable signal as soon as at least the initial stages of an impact are detected—that is to say if, for example, the associated sensor signal exceeds a low threshold value. Assigned firing units can be triggered only if both the enable signal and the actual firing code signal described above from the impact sensor unit are present.

In accordance with another feature of the invention, the enable signal is supplied by the control unit as a function of the acceleration profile which is determined by the acceleration sensor.

In accordance with yet another feature of the invention, the enable signal is supplied by the control unit if the acceleration exceeds a limiting value.

In accordance with an additional feature of the invention, the enable signal is supplied by the control unit if a defined status of the device for detecting objects or vehicle occupants is detected by the control unit.

The advantage of the various embodiments of invention is in particular the fact that the computational power, which is to be provided with the conventional central evaluation devices, can be shifted or transferred between components or can be shifted or transferred to other components. In the case of the impact sensor units and the firing units, standard hardware and software with low computational power can be used. The advantage in terms of the computational power is also evident in a saving in time with respect to the firing of firing elements. Whereas the conventional devices require a refined arbitration and prioritization procedure when processing sensor signals in order to comply with triggering times, which must be met at least to some extent, early triggering of firing elements is ensured, in the case of the device according to the invention, simply by the operating states of the impact sensor unit being fed onto the bus line and relevant information being tapped from the bus line by the firing units. Computational operations which are irrelevant to the respective firing unit are not carried out in the firing evaluator. The advantages increase in an exponential manner as the number of sensors and firing elements increases. The expenditure on communication which has until now required enormous computational work and computing time between a conventional central control unit and remote sensor or firing units is reduced by the device according to the invention. In addition, the device according to the invention is extremely adaptable. Impact sensor units and/or firing units can be connected in any desired way to an existing bus system, and all that is required is to adapt the software. Furthermore, the central control unit no longer has to provide an excessive computational power.

Other features which are considered as characteristic for the invention are set forth in the appended claims.

Although the invention is illustrated and described herein as embodied in a device for protecting vehicle occupants in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
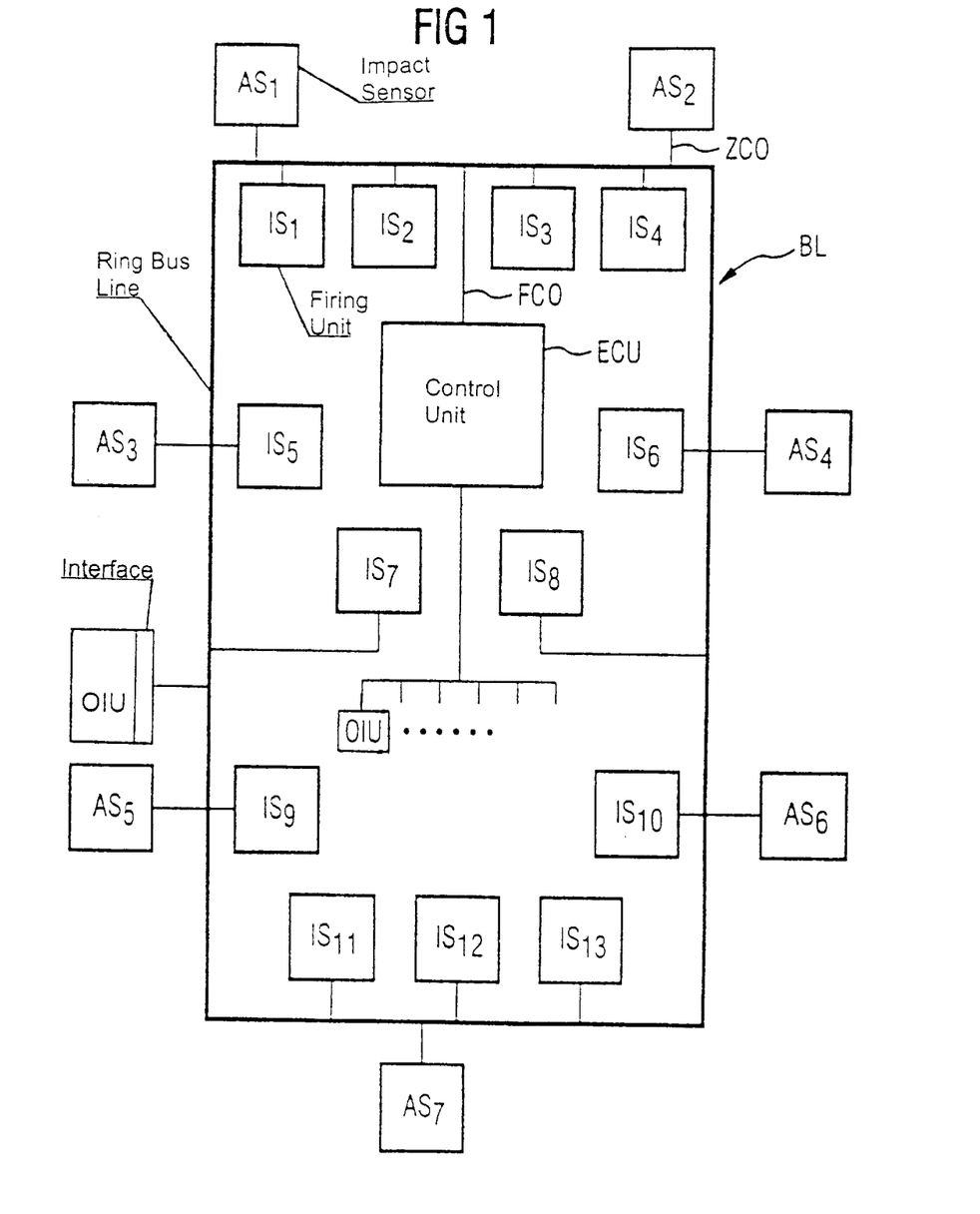
FIG. 1 is a block circuit diagram of the device according to the invention.

Description of the Preferred Embodiments:

Referring now to the figures of the drawings in detail and first, particularly, to FIG. 1 thereof, there is shown a schematic view of a ring bus line BL with connected impact sensor units $AS_1$ to $AS_7$ and connected firing units $IS_1$ to $IS_{13}$, and also of a connected control unit ECU which supplies the coded enable signal (FCO). Further various sensors, for example a device OIU for detecting objects and/or vehicle occupants, are connected to the control unit ECU.

Figure 2:
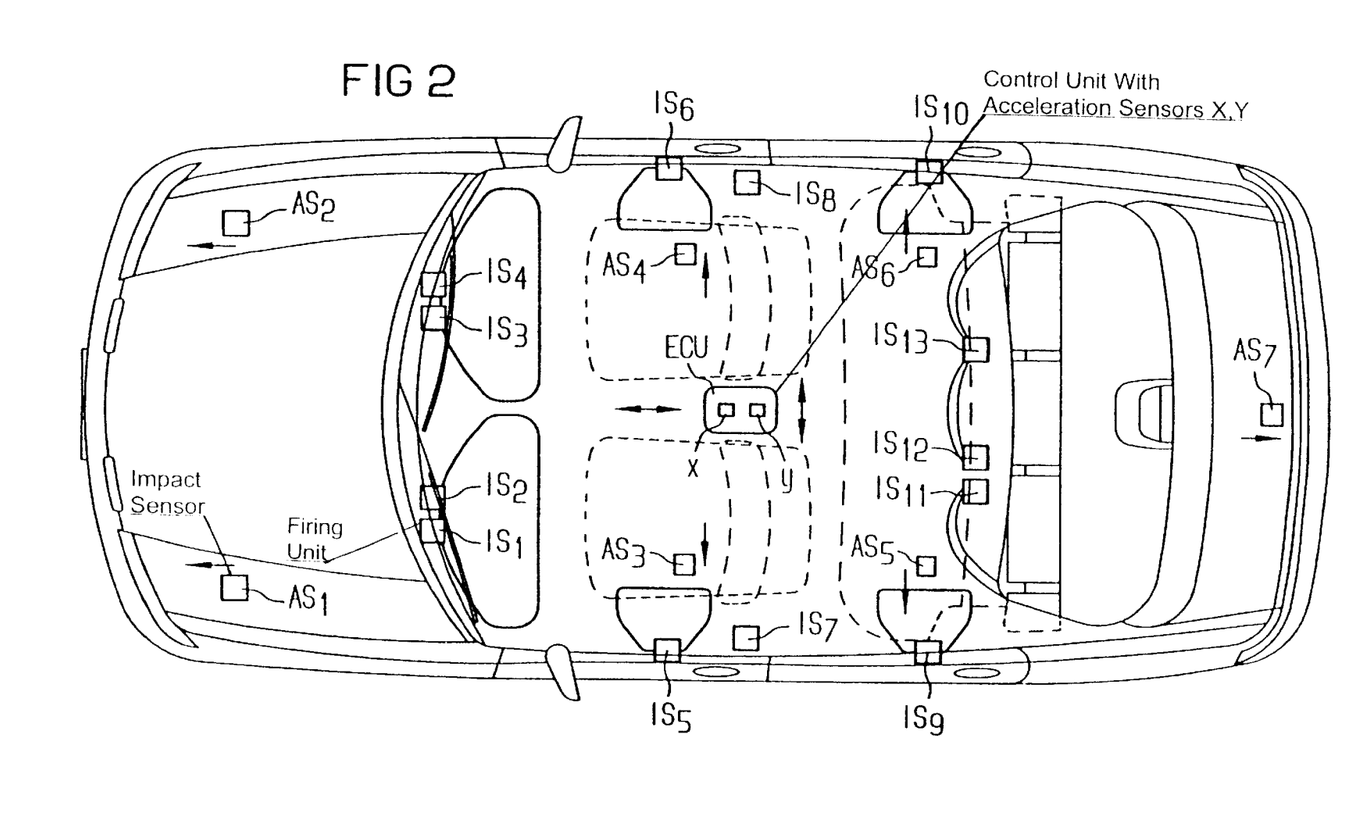
FIG. 2 is a plan view of a motor vehicle illustrating the spatial configuration of the device of FIG. 1 in the motor vehicle.

FIG. 2 shows the spatial configuration or positioning of the control unit ECU of the impact sensor units $AS_1$ to $AS_7$ and of the firing units $IS_1$ to $IS_{13}$ according to FIG. 1 in a motor vehicle. For reasons of clarity, the electrical or optical bus line BL according to FIG. 1 which connects the individual units is not shown in FIG. 2. Each of the impact sensor units $AS_1$ to $AS_7$ contains an acceleration-sensitive impact sensor whose directional sensitivity is indicated in FIG. 2 by an arrow next to each symbol for an impact sensor unit AS. The first impact sensor $AS_1$ is provided near to the radiator at the edge of the left-hand half of the vehicle and is sensitive to decelerations of the vehicle along the longitudinal axis of the vehicle, such as occur in the event of a head-on impact or oblique impact. The same applies to the second impact sensor unit $AS_2$, which is however provided near the radiator at the edge of the right-hand half of the vehicle. The impact sensor units $AS_3$ to $AS_6$ are acceleration-sensitive to transverse accelerations of the vehicle, the impact sensor units $AS_3$ and $AS_5$ are sensitive in particular to decelerations of the vehicle in the event of an impact on the left-hand side of the vehicle, and the impact sensor units $AS_4$ and $AS_6$ are sensitive to transverse decelerations of the vehicle in the event of an impact on the right-hand side of the vehicle. The impact sensor units $AS_3$ to $AS_6$ are provided at the edge of the vehicle and mounted, for example, on the bodywork pillars, on the transverse member of the bodywork or the door sills. Here, in each case two impact sensor units $AS_3$ and $AS_4$ are provided spatially in the vicinity of the front seats and two impact sensor units $AS_5$ and $AS_6$ are provided spatially in the vicinity of the rear seats. The seventh impact sensor unit $AS_7$ is provided at the tail end of the vehicle and is sensitive to positive vehicle accelerations along the longitudinal axis, such as occur in the event of a rear impact. The impact sensor units AS according to FIG. 2 are therefore provided remote from a central position in edge regions of the vehicle.

Each acceleration-sensitive impact sensor of this device can, of course, be sensitive not only to an acceleration from a single direction but also to an acceleration from the opposite direction. Such a so-called dual pole configuration of the acceleration sensors used may be necessary, in particular, to sense redundant accelerations at different locations in the motor vehicle, and thus to increase the reliability of the triggering of a vehicle occupant protection device.

Figure 4:
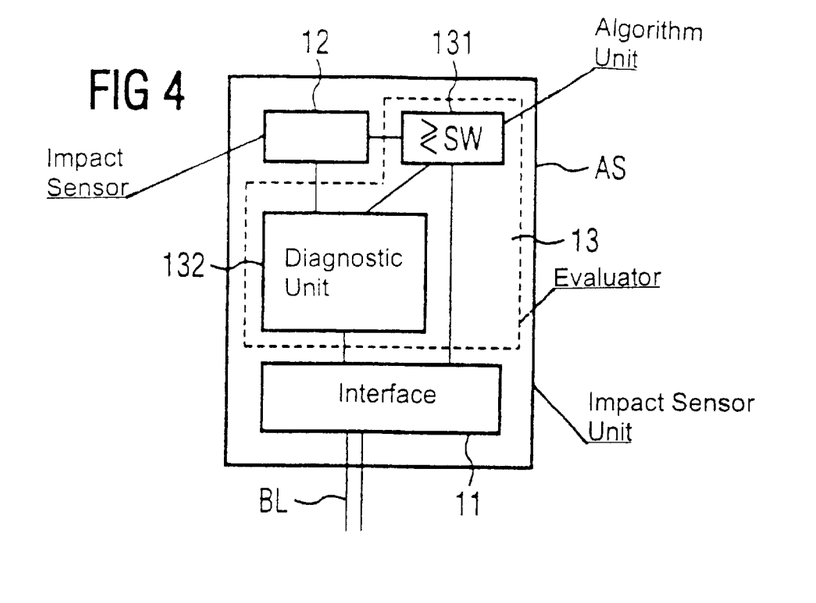
FIG. 4 is a block diagram of an impact sensor unit.

FIG. 4 shows by way of example an impact sensor unit AS with an impact sensor 12, with an evaluator 13 having an algorithm unit 131 and a diagnostic unit 132, and with an interface 11 to the bus line BL. The impact sensor 12 can, according to FIG. 2, be embodied in particular as an acceleration-sensitive sensor which supplies the algorithm unit 131 with an electrical signal which is proportional to the measured acceleration. However, it can also be embodied as an acceleration switch whose seismic mass, which can be deflected as a function of the acceleration, causes a switching signal when a minimum degree of deflection occurs. Alternatively, the impact sensor 12 can also be embodied as another type of impact sensor, for example for detecting a deformation of the vehicle bodywork on the basis of different physical principles.

The signal which is supplied by the impact sensor 12 is evaluated in the impact evaluator 13, preferably a microprocessor or a PAL (Programmable Array Logic) hardware circuit, with an associated memory in each case. On the basis of the evaluation, the impact evaluator 13 causes, if appropriate, an encoded message to be output onto the connected bus line BL. For example, the impact signal which is supplied by the impact sensor 12 is compared with a threshold value SW in the algorithm unit 131. When the threshold value is exceeded, a message which includes this information is fed onto the bus line BL.

The interface 11 serves here for processing communication and includes interface layers ranging from the physical interface layer to the functional interface layer. It includes the logic for the connection to the bus line BL including energy management and access management. The diagnostic unit 132—preferably an ASIC (Application-Specific Integrated Circuit)—checks the operational capability of the impact sensor 12, of the algorithm unit 131 and of the interface 11 using suitable diagnostic routines/measurements. The algorithm unit 131 is preferably embodied as a microprocessor with a nonvolatile memory ROM (Read-Only Memory) for operating instructions and a nonvolatile memory EPROM (Erasable Programmable Read-only Memory), which can be written to, for operational characteristic values. Operational characteristic values are, in particular, parameters and data records which differ for different spatial configurations or positions of the impact sensor unit AS. The operational characteristic values are preferably programmed after the device has been installed in the motor vehicle at the end of the production line—thus also for the firing units which are described later. The diagnostic unit 132 is preferably separated in terms of its hardware from the hardware of the algorithm unit 131. The impact sensor unit AS preferably has two impact sensors with different physical measuring principles, permitting mutual checking for operational capability. For example, an appropriate message is not output by the impact sensor unit AS onto the bus line BL until the algorithm unit 131 has detected that both impact sensors 12 have detected an impact of a minimum strength.

Figure 5:
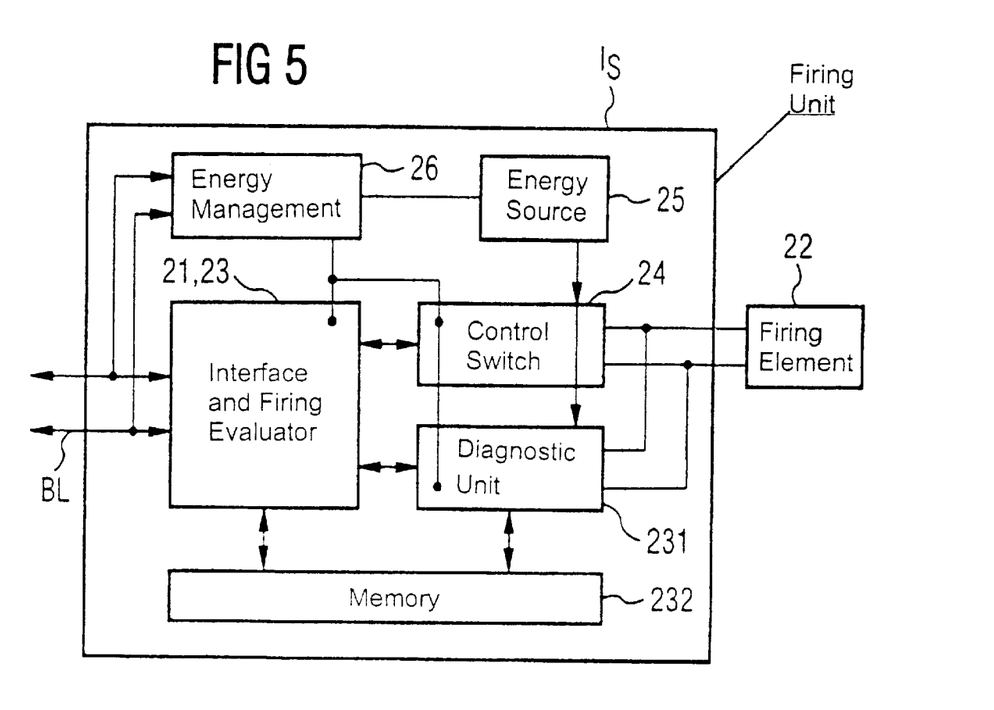
FIG. 5 is a block diagram of a firing unit.

The configuration of a firing unit IS of the device according to the invention is explained with reference to the block circuit diagram according to FIG. 5. The interface 21 and firing evaluator 23 functional unit picks up code signals received by the bus line BL, decodes these registered code signals and evaluates them. A memory 232 is provided for storing information transmitted via the bus line BL. If the firing evaluator 23 detects that a sufficiently strong impact has occurred, a controllable switching device 24 is switched to a conductive state. In its conductive state, the controllable switching device 24 electrically connects an energy source 25 and a firing element 22 which is connected to the firing unit IS, with the result that the energy stored in the energy source 25—preferably an energy accumulator capacitor—is transmitted to the firing element 22 and causes it to fire. An energy management unit 26 extracts the energy transmitted via the bus line BL and supplies it to firing unit components such as the interface 21 and evaluator 23 and ensures in addition that sufficient energy is made available in the energy source 25. A diagnostic unit 231 checks all the components of the firing unit IS through the use of test measurements. The controllable switching device 24 and diagnostic unit are preferably provided on an ASIC. The firing evaluator 23 is preferably a microprocessor. The firing element 22 of the firing unit IS is preferably provided in a gas generator of the assigned vehicle occupant protection device, with the result that gas is released as a result of its firing. The firing unit IS is provided spatially next to the vehicle occupant protection device. Owing to the short line length which is thus achieved between the firing element 22 and the firing unit IS, the risk of a short circuit on this line is greatly reduced. The spatial configuration of the firing unit IS in the assigned vehicle occupant protection device is to be understood in terms of it being provided in a remote position with respect to a central position in the vehicle.

According to FIG. 2, the firing units $IS_1$ and $IS_2$ are assigned to the driver's airbag and are responsible for the firing of one respective stage/gas generator/chamber of the driver's airbag. Given the spatial proximity of the firing units $IS_1$ and $IS_2$, the latter can also be combined and embodied with a common firing evaluator, a common interface and, if appropriate, merely separate energy sources for each assigned firing element.

The firing units $IS_3$ and $IS_4$ use two stages of a front seat passenger's airbag in the same way. The firing units $IS_5$ and $IS_6$ are assigned to side airbags for the driver and front seat passenger, and the firing units $IS_9$ and $IS_{10}$ operate side airbags for rear-seat vehicle occupants. The firing units $IS_7$, $IS_8$ and $IS_{11}$ to $IS_{13}$ operate belt pretensioning devices for the driver and front seat passenger and 3 rear-seat vehicle occupants.

Figure 6:
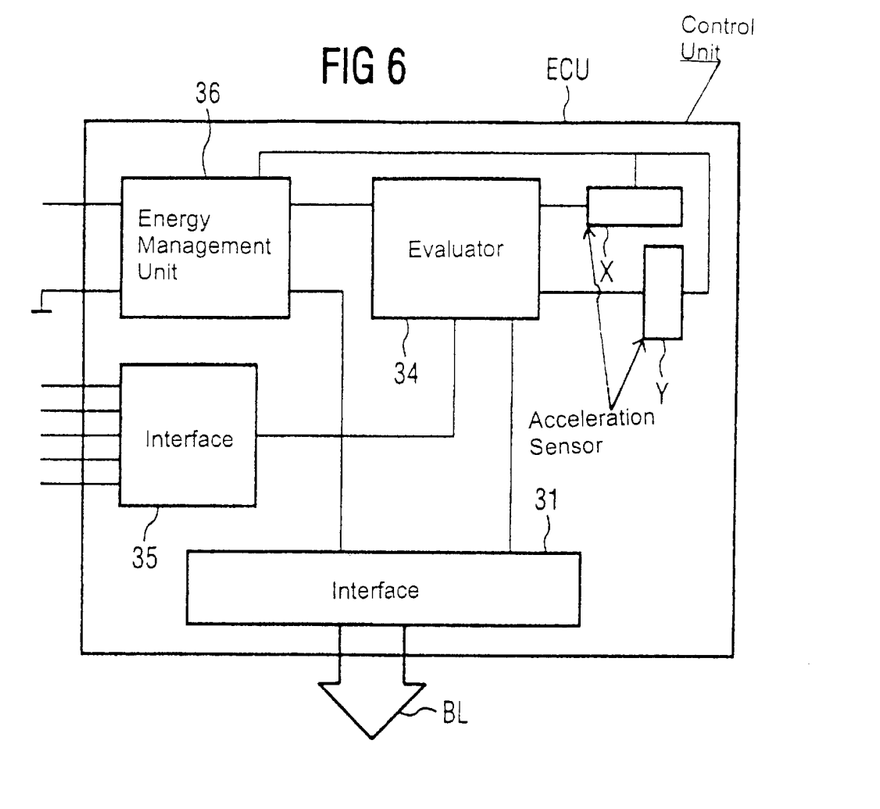
FIG. 6 is a block diagram of a central control unit.

FIG. 6 shows a block circuit diagram of the control unit ECU which, according to FIG. 2, is provided at a central position in the vehicle, that is to say for example on the vehicle tunnel, and is also connected to the bus line BL. The control unit ECU preferably contains an acceleration sensor X which is sensitive to positive and negative accelerations of the vehicle along the longitudinal axis of the vehicle, and an acceleration sensor Y which is sensitive to positive and negative accelerations of the vehicle in the transverse direction with respect to the longitudinal axis of the vehicle. An evaluator 34 is also provided for the signals of the acceleration sensors X and Y. As a function of the evaluation of the acceleration signals, the evaluator 34 outputs an encoded message onto the bus line BL via an interface 31. In addition, an energy management unit 36 is provided which receives, for example, the voltage of the vehicle's electrical system and converts it into a supply voltage for the components of the control unit ECU. In addition, the control unit ECU may have a further interface 35 for connecting devices for detecting objects and/or vehicle occupants. Signals of such further sensors are also processed in the evaluator 34 and can equally prompt the control unit ECU to output code signals.

Figure 3A:
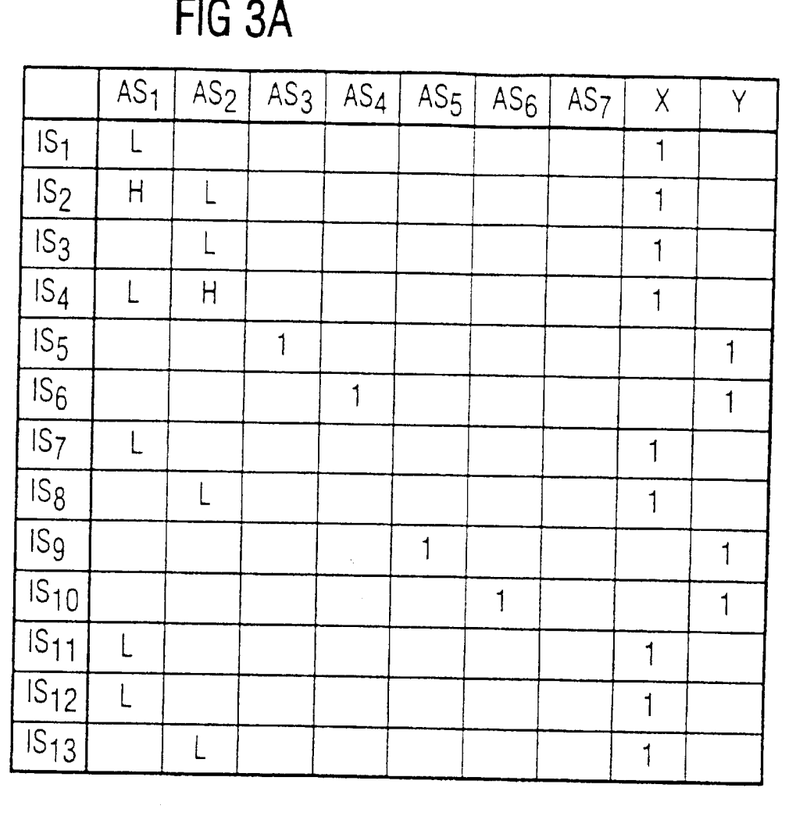
FIGS. 3A and 3B are truth tables for the triggering strategy of individual vehicle occupant protection devices.
Figure 3B:
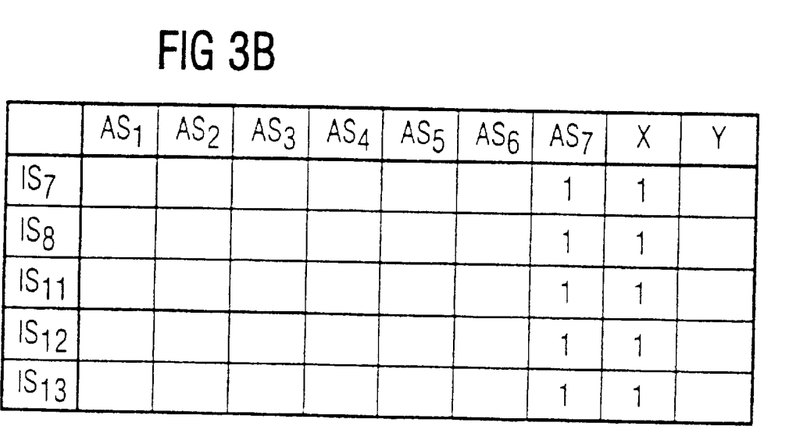

FIGS. 3A and 3B show, in the form of a truth table, the triggering of the firing units of a device according to FIGS. 1 and 2 as a function of the messages supplied by the impact sensor units AS. Here, the impact sensor units $AS_1$ to $AS_7$ and the central longitudinal acceleration sensor X and the central transverse acceleration sensor Y are listed horizontally. The firing units $IS_1$ to $IS_{13}$ are provided vertically. The entries in the table comply with the following syntax and semantics: a one stands for a threshold value being exceeded by the signal of the associated impact sensor if just one threshold value is assumed to be relevant, an L stands for a low threshold value being exceeded by the associated impact sensor, an H stands for a threshold value which has been given a higher setting in comparison to the low threshold value being exceeded if a plurality of threshold values are assumed to be relevant.

The truth table is accordingly to be interpreted as follows: The firing unit $IS_1$ fires the associated firing element—namely the first stage of the driver's airbag—if the impact signal of the impact sensor unit $AS_1$ which is provided at the front on the left exceeds a low threshold value and the central longitudinal acceleration sensor X simultaneously indicates that a threshold value which is stored there is exceeded. This triggering strategy which is based on messages of the first impact sensor unit $AS_1$ and of the central control unit ECU is stored in the firing unit $IS_1$ or its firing evaluator.

Such a truth table can preferably be combined with a further truth table according to FIG. 3B with an OR operation which then permits, for individual vehicle occupant protection devices $IS_7$, $IS_8$ and $IS_1$ to $IS_{13}$, not only a triggering combination of impact sensor messages, but alternatively a further triggering combination. An adapted triggering strategy can be derived according to such schemes for each firing unit and/or each vehicle occupant protection device.

The strategy or philosophy on which the device according to the invention is based is that the possible impact locations of a vehicle are covered by triggering units, each triggering unit being assigned an "area of responsibility". Furthermore, each impact sensor unit is assigned at least one vehicle occupant protection device for triggering. Preferably, the impact sensor unit and assigned firing unit are not too far away from one another spatially. In order not to assign the sole responsibility of the triggering of a vehicle occupant protection device to a single triggering sensor unit, the firing unit preferably requires the signal of a further impact sensor unit, wherein relatively low requirements in terms of strength or the threshold value are made of the impact signal which is detected by the further impact sensor unit. The impact sensor $AS_4$ preferably serves as a safing sensor for the impact sensor $AS_6$, or else the impact sensor $AS_5$ serves as safing sensor for the impact sensor $AS_6$ if the sensitivity of the impact sensor units has a bipolar orientation. The safing function of the further impact sensor unit can also be performed by the central control unit, in which case, depending on the direction, the longitudinal acceleration sensor X and transverse acceleration sensor Y of the central control unit ECU are preferably suitable for this safing function. The regions of responsibility of the individual impact sensor units overlap, with the result that, for example, the firing unit $IS_7$ according to FIG. 2 can also be triggered with equal priority by the impact sensor units $AS_3$ and $AS_5$.

If an AND operation performed on messages of the control unit ECU and of the impact sensor units AS causes a firing element 22 in a firing unit IS to be triggered, a memory, in which the message which arrives first is stored, is to be provided in the firing unit IS. Such a firing unit IS may then, if appropriate, have a timer which checks the time between the arrival of the first message and the arrival of the further message, and, if appropriate, prevents triggering if a predefined time period is exceeded.

If sensors for monitoring the interior of the vehicle, detecting a weight, detecting vehicle occupants and/or objects, detecting child's seats or other things are connected to the control unit ECU, states of these sensors which are detected by the evaluator of the control unit ECU can also be output onto the bus line in the form of code signals, and be decisive for the triggering of individual firing units—also in terms of the prevention of triggering or the metering or proportioning of a triggering process.

A code signal which is transmitted by the control unit ECU onto the bus line BL can, for example, also preferably contain the following information which goes beyond an assessment of the acceleration signal: The front seat passenger's seat is occupied and at the same time a minimum longitudinal acceleration is detected by the central longitudinal acceleration sensor. This code signal can then act as an enable signal for the firing units $IS_3$ and $IS_4$, which are fired in particular if the impact sensor unit $AS_2$ additionally detects an appropriate impact. In this respect, the truth tables according to FIGS. 3A and 3B can be regarded as a triggering matrix for the various firing units, wherein each firing unit has implemented, as hardware or software, its own signal combinations relevant to the triggering.

In addition, the central control unit ECU with longitudinal and transverse acceleration sensors X and Y as safing sensors can be used for all the firing units connected to the bus line due to the fact that the state of the bus line BL can be switched over by the control unit ECU. Here, at least three different bus states can be defined:

BL1. diagnostic state
BL2. readiness to trigger
BL3. not ready to trigger.

After the device has been put into service, the control unit ECU switches the bus line BL into the diagnostic operating state BL1. Firing units IS can generally not be fired in this state. Transmitted code signals between the sensing units and firing units AS and IS or the central control unit ECU relate exclusively to diagnostic functions. After the diagnostic operating state BL1 has terminated, the control unit ECU switches the bus line into the "not ready to trigger" operating state BL3. Individual firing code signals from impact sensor units do not cause assigned firing units to trigger in this operating state BL3 either. The entire bus line BL is switched to the "readiness to fire" operating state BL2 only if at least one of the acceleration sensors X or Y of the control unit ECU registers a minimum impact. Only then can, for example, a firing code signal of an impact sensor unit lead to the triggering of an assigned firing unit. In this context it is possible to make provisions that also all the vehicle occupant protection devices for a head-on impact and a rear impact are in principle enabled as a result of an impact being detected by the transverse acceleration sensor Y, however provisions can also be made such that the opposite applies. The "readiness to trigger" operating state BL2 can, however, also be refined to the effect that a "readiness to trigger for head-on impact and rear impact" operating state BL31 is introduced if the longitudinal acceleration sensor X of the control unit ECU detects a head-on impact or rear impact, and a "readiness to trigger for side impact" operating state BL32 is introduced if the transverse acceleration sensor Y of the control unit ECU detects an impact: in this context the transverse acceleration sensor Y of the control unit ECU detects a side impact.

The triggering strategy described above differs from the other triggering strategies in that, in the case of a specific bus state defined by the control unit ECU, the control unit ECU only permits defined code signals on the bus line BL. If, for example, an impact sensor unit AS attempts to output an inadmissible firing code signal in the "diagnostic" operating state, this is prevented by the bus system, or this firing code signal is at least prevented from being able to cause triggering at its receiver.

A code word of the device may be structured in different ways: the code word can include, for example, only the destination address of the firing unit which is to be addressed. If, for example, the firing unit $IS_1$ can be fired either by the impact sensor unit $AS_1$ or by the impact sensor unit $AS_2$ or by the impact sensor unit $AS_7$, in each case on condition that the longitudinal acceleration sensor X also senses, as a safing sensor, an impact, it is possible, if the bus system has been placed in the ready to trigger state due to the longitudinal acceleration X, for any of the aforementioned impact sensor units $AS_1$, $AS_2$ or $AS_7$ to initiate a triggering of the firing unit $IS_1$ if the respective impact sensor unit outputs onto the bus line EL an encoded message composed solely of the address of the firing unit $IS_1$ and, if appropriate, of further checksum digits or the like.

Alternatively, a code signal of an impact sensor unit may be formed such that it contains merely the sender. It is then the function of the firing evaluator to evaluate and check the sender of the messages arriving on the bus line to determine whether triggering is necessary on the basis of the message of this sender. If an impact sensor unit can transmit a plurality of operating states/threshold value comparisons, it is recommended to provide in the data transmission format, in addition to the addressee and/or transmitter, one or more status bits for transmitting the respective operating state.

The bus line can be embodied as a continuous ring bus or as an open bus and can have a wide variety of access strategies. The connected impact sensor units and firing units can also be supplied with energy via the bus line. The energy supply can be made available here through the use of a separate switching unit which is connected to the bus line or can be provided by the control unit ECU. The central control unit ECU can also be embodied as a so-called master for the communication operations. Here, the control unit permanently monitors the operating state of the connected impact sensor units and firing units and diagnoses the bus system. If the control unit detects that one of the impact sensor units is defective, it can perform the function of this impact sensor unit and dispatch or receive messages in the name of this defective impact sensor unit, for example. In addition, the administration of addresses of the units connected to the bus is performed by the control unit, as are initialization routines when the device is brought into service. In addition, messages and operating states of the impact sensor units and firing units can be stored in a memory of the control unit in the manner of an impact data recording.

Figure 7:
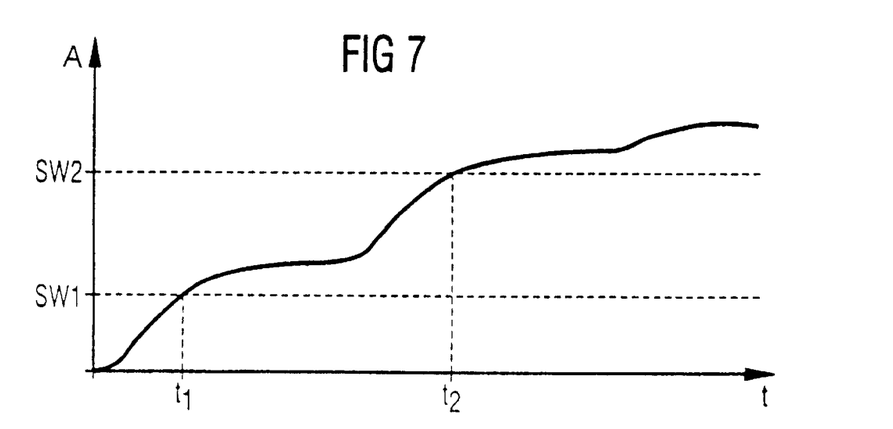
FIG. 7 is a graph of an exemplary impact profile over time.

FIG. 7 shows an exemplary impact signal profile A in the event of a head-on impact, registered by an acceleration sensor of the impact sensor unit $AS_1$ according to FIG. 2. If the impact evaluator 13 detects that the acceleration signal A has exceeded a first threshold value SW1, an appropriately encoded message is output onto the bus line BL, for example with the address of the firing unit $IS_7$ for the seat belt pretensioning device, which is triggered given correct decoding in the firing unit $IS_7$. When the threshold value $SW_2$ is exceeded by the registered acceleration signal A at the time t2, a further encoded message, for example for actuating the first stage $IS_1$ of the driver's airbag, is output onto the bus line.

The control unit can have a sensor for detecting rolling over, with the result that in the event of rolling over appropriate firing units can be triggered by vehicle occupant rollover protection device via the bus line. If appropriate, a separate impact sensor unit can contain a sensor for detecting rolling over.

For programming at the end of the production line in order to transfer operating characteristic values to the impact sensor units and the firing units after their installation in the vehicle, a further bus operating state is provided in which the programming is permitted, but triggering of vehicle occupant protection device is not. When the programming of the control unit is terminated, this bus operating state is cancelled again.

We claim:

1. A device for protecting vehicle occupants in a motor vehicle, comprising:
    a data line configured as a bus line;
    at least two impact sensor units to be disposed remote from a central region of a motor vehicle, each of said at least two impact sensor units having an impact sensor unit interface connected to said data line for outputting a code signal onto said data line; and
    at least two firing units to be disposed at respectively assigned vehicle occupant protection devices, said at least two firing units being directly connected to said at least two impact sensor units via said data line, each of said at least two firing units having a firing unit interface for receiving the code signal outputted by one of the at least two impact sensor units, and having an energy source for providing energy for triggering the respectively assigned vehicle occupant protection devices.

2. The device according to claim 1, wherein said at least two impact sensor units each have an impact sensor for detecting an impact and generating an impact signal, and an evaluator for evaluating the impact signal.

3. The device according to claim 2, wherein said evaluator supplies a firing code signal as a function of a registered impact profile.

4. The device according to claim 2, wherein said evaluator supplies a firing code signal if one of the impact signal supplied by said impact sensor and a signal derived from the impact signal exceeds a threshold value.

5. The device according to claim 2, wherein said impact sensor is an acceleration sensor for supplying an acceleration signal.

6. The device according to claim 1, wherein said at least two firing units each have an evaluator for evaluating the code signal, a firing element to be assigned to at least one of the vehicle occupant protection devices, and a switching device, controllable by said evaluator, for electrically connecting said energy source to said firing element.

7. The device according to claim 6, wherein said switching device is switched to a conductive state by said evaluator if said evaluator detects a defined firing code signal.

8. The device according to claim 6, wherein said at least two impact sensor units include a first impact sensor unit for generating a first defined firing code signal and a second impact sensor unit for generating a second defined firing code signal, said switching device is switched to a conductive state by said evaluator if said evaluator detects at least one of the first defined firing code signal and the second defined firing code signal.

9. The device according to claim 6, including a control unit connected to said data line, said control unit having a control unit interface for outputting a coded enable signal onto said data line, said impact sensor units configured for outputting at least one defined firing code signal, said switching device being switched to a conductive state by said evaluator if said evaluator detects the at least one defined firing code signal and the coded enable signal.

10. The device according to claim 9, wherein said control unit includes at least one acceleration sensor for determining an acceleration profile and a control unit evaluator for evaluating the acceleration profile, said control unit supplies the coded enable signal as a function of the acceleration profile.

11. The device according to claim 10, wherein said control unit supplies the coded enable signal if an acceleration limiting value is exceeded.

12. The device according to claim 10, including a detector, electrically connected to said control unit, for detecting at least one of an object and a vehicle occupant, said control unit supplies the coded enable signal if a defined status of the detector is detected.

13. The device according to claim 1, including a control unit connected to said data line, said control unit having a control unit interface for outputting a further code signal onto said data line.

14. The device according to claim 13, wherein said control unit is to be provided in the central region of the motor vehicle and has at least one acceleration sensor and an evaluator for evaluating an acceleration profile.

15. The device according to claim 14, wherein said at least one acceleration sensor is configured to register longitudinal accelerations of the motor vehicle.

16. The device according to claim 15, wherein said at least one acceleration sensor includes a first acceleration sensor configured to register the longitudinal accelerations of the motor vehicle and includes a second acceleration sensor configured to register transverse accelerations of the motor vehicle.

17. The device according to claim 13, including a detector, electrically connected to said control unit, for detecting at least one of an object and a vehicle occupant.

18. The device according to claim 1, including a detector, connected to said data line, for detecting at least one of an object and a vehicle occupant, said detector has an interface for outputting code signals onto said data line.

19. In a motor vehicle having a central region and having vehicle occupant protection devices, a device for protecting vehicle occupants, comprising:

a data line configured as a bus line;

at least two impact sensor units disposed remote from the central region of the motor vehicle, each of said at least two impact sensor units having an impact sensor unit interface connected to said data line for outputting a code signal onto said data line; and at least two firing units assigned to the vehicle occupant protection devices and disposed at the vehicle occupant protection devices, said at least two firing units being directly connected to said at least two impact sensor units via said data line, each of said at least two firing units having a firing unit interface for receiving the code signal outputted by one of the at least two impact sensor units, and having an energy source for providing energy for triggering the vehicle occupant protection devices.

* * * * *